Figures 1, 2:
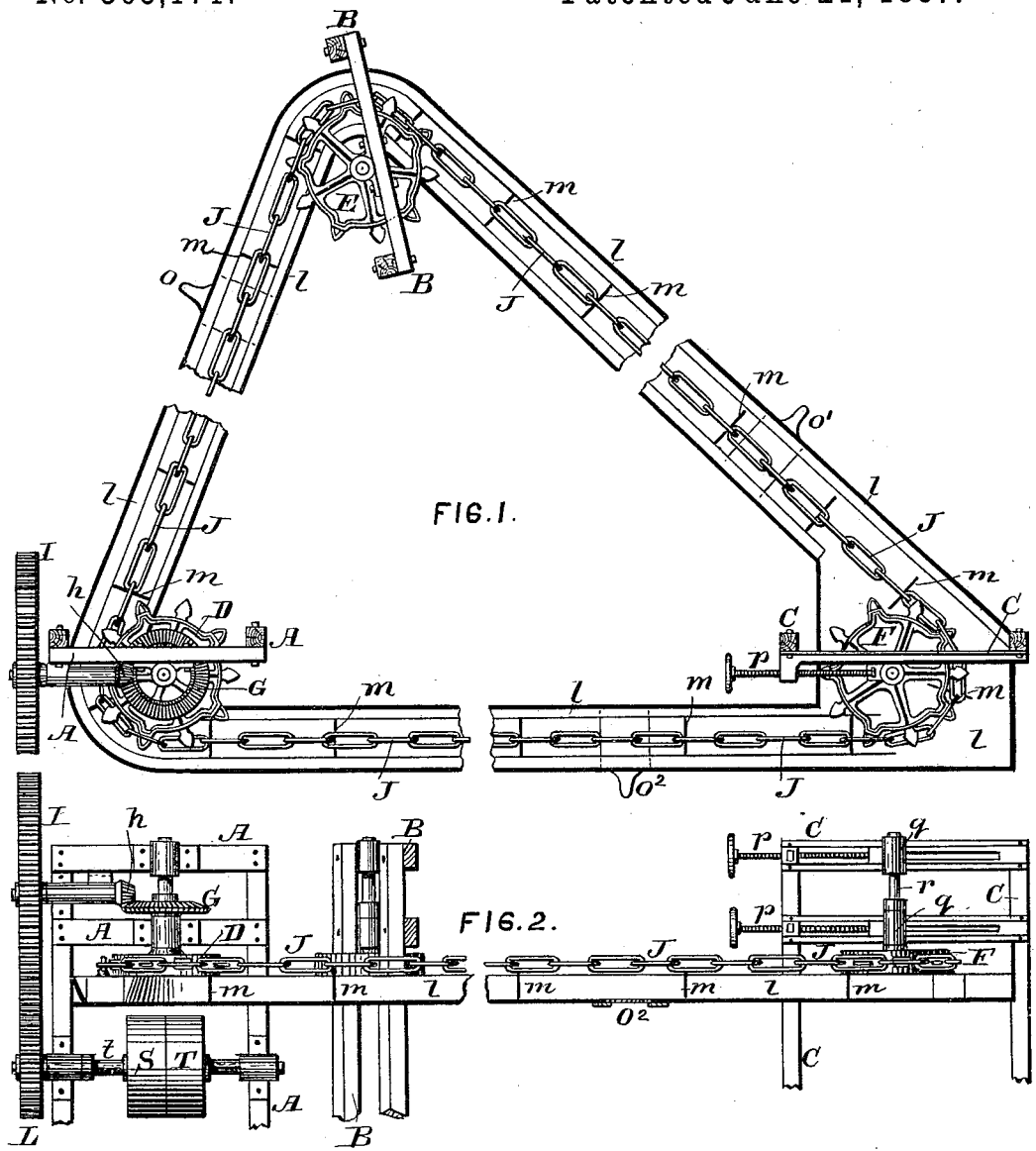

(No Model.)

J. M. DODGE.
CONVEYER.

No. 365,171. Patented June 21, 1887.

WITNESSES:
J. Henry Kaiser
Wm S. Scott

INVENTOR
James M. Dodge
By J. N. McIntire
ATTORNEY

UNITED STATES PATENT OFFICE.

JAMES M. DODGE, OF PHILADELPHIA, PENNSYLVANIA, ASSIGNOR TO THE EWART MANUFACTURING COMPANY, OF CHICAGO, ILLINOIS.

CONVEYER.

SPECIFICATION forming part of Letters Patent No. 365,171, dated June 21, 1887.

Application filed February 2, 1887. Serial No. 226,333. (No model.)

*To all whom it may concern:*

Be it known that I, JAMES M. DODGE, of Philadelphia, in the county of Philadelphia and State of Pennsylvania, have invented certain new and useful Improvements in Conveyers; and I do hereby declare that the following is a full, clear, and exact description thereof, reference being had to the accompanying drawings, making part of this application.

My invention relates to that type or species of chain conveyers which is used to carry material to be handled in different directions on substantially the same level. In this class of conveyer apparatus it has heretofore been customary to employ two or more runs of conveyer chains and flights, to effect the carrying of the stuff along in as many different troughs and directions and to have the moving parts of the machinery arranged and operating so that (as usual in other forms of chain conveyers) the chain-wheels should turn on axes parallel with the plane of the trough floor or floors, and so that the flight attached to the chain should in turning on the chain-wheels project radially from the peripheries of said wheels. Thus constructed, the heretofore known and used form of conveyer has involved a mode of operation such that one-half of each run of chain, (and its attached flights,) has necessarily remained idle during the working or running of the machine, only that half of each endless chain, with its attached flights, that was running in a trough being operative for the performance of any carrier office or function.

I propose to provide for use a conveyer machine or apparatus in which, with the use of a single run of chain or other belt provided with flights arranged in a novel manner, the material to be handled may be conveyed at one and the same time in any number of different directions in as many different troughs, and in which conveyer-machine every part of the chain and all the flights attached to it may be made to simultaneously perform duty in handling or moving the contents of the troughs; and to this main end and object my invention may be said to consist, essentially, in the combination, with ordinary conveyer-troughs arranged to run in any desired number of directions and located in substantially the same plane, of a single run of chain, or one endless band, arranged to run on a series of chain-wheels the axes or shafts of which are transverse to the plane in which the troughs lie, and which chain or endless band has its flight arranged so as to project laterally from the chain-wheel, (as the chain turns thereon,) instead of radially from its periphery, all as will be hereinafter more fully explained, and as will be more explicitly described in the claim of this specification.

To enable those skilled in the art to which my invention relates to better understand and to practice the latter, I will now proceed to more fully describe my improved construction of conveyer-machine, referring by letters to the accompanying drawings, which form part of this specification, and in which I have shown my invention carried out in that form in which I have so far successfully practiced it, and which is about the best now known to me.

In the drawings, Figure 1 is a plan or top view of one form of apparatus made according to my invention and adapted to convey stuff or material within three different troughs in as many different directions. Fig. 2 is a partial side view or elevation of the same.

In the drawings I have shown each of the three troughs broken out near the middle of its length and the angular portions of the conveyer moved closer to each other than they would be on the scale shown, in order to illustrate the triangular contour of the conveyer, (on such scale,) and at the same time bring the figures of the drawings within the prescribed superficial limits for a drawing.

In both figures the same parts will be found designated by the same letters of reference.

A, B, and C are three frames or frame-works, on which are mounted, to run in suitable bearings, the three vertically-arranged shafts of three chain-wheels, D, E, and F, that, as shown, are adapted to rotate in horizontal planes. One of these chain-wheels, (that marked D,) is shown as a driver, being formed or provided with a bevel-gear, G, with which engages a miter-pinion, $h$, on the shaft of the spur-gear I, that in turn meshes with the pinion L of a counter-shaft, t, on which are arranged the fast and loose pulleys S and T, that are supposed to be belted or banded to the source of motive power for the machine. The other two wheels act only as idlers to carry and over which runs the conveyer-chain, and one of them, (that marked F,) has the journal-boxes q of its shaft r mounted so that they may be adjusted on the frame C by means of the set-screw or screw-shafts p p, provided with suitable hand-wheels for the purpose of adjusting the wheel F, so as to take up any unnecessary slack in the carrier-chain. This chain J, I have shown of the cable type; but it may be of any desirable form adapted to work as a drive and carrier chain, and of whatever structural form it may be, the structure of the wheels D, E, and F must, of course, match it, so that the chain and wheels will work or run together in the known and necessary manner.

From the chain J project flights or conveyer devices m, that are adapted to work in a well-known manner within the troughs l, within which they travel along, and within which the stuff or material is pushed along (in the usual manner) by them.

I have shown an arrangement of three lines of troughing which meet each other at their ends, so as to produce an apparatus triangular in form or contour; but in lieu of this any other number and arrangement of troughs may be adopted, as circumstances may require, so long as the arrangement be such as to permit the chain J to form an endless carrier-band. At o, o', and o², I have shown slide-valves in the bottoms of the troughs, which may be used in the ordinary manner to permit the discharge or exit of the contents of said troughs.

The material to be handled may be supplied in any usual manner at any one point, or more, in the system of troughs, and may be carried in either direction in each trough in which it may be determined to drive the conveyer-chain and its flights.

The general operation of my improved contrivance will be fully understood (from the drawings and after what has been so far explained) from the following explanations: Supposing material to be supplied to one or more of the troughs l at one or another point in its length and the carrier-chain J, with its flights m, to be set in motion through the medium of the system of gearing shown, the said material will be pushed or conveyed along within one or more of the troughs, and may be discharged therefrom at any point at which means for its exit—as, for instance, a slide-valve such as shown—may be provided. The chain-wheels being arranged in planes parallel with that in which the troughs lie, (and preferably a short distance above the upper edges of the troughs,) and the chain and its flights being arranged relatively to the wheels, so that the flights m project (downwardly) from one side of each wheel, it follows that all of the flights are always in some one of the troughs, and can therefore be always at work.

Under the novel construction shown, a single run of conveyer chain and flights can be made to perform the service of carrying material or materials continuously from a number of different points in the route or circuit of the combined troughs, and the conveyed stuff may be discharged at any number of points in the said route. In this manner, by various arrangements together of the troughs composing an entire route or circuit, conveyers may be put up according to my new plan that will with one run of chain and flights perform all the carrying service necessary in large establishments where it may be desired to convey one or more kinds of material from several points of supply to various destinations, and this without running any part of the conveyer chain and flights idle at any time, and with a structure simpler and more desirable in many other particulars than those heretofore used for somewhat analogous purposes.

What I claim, broadly, as of my invention, and desire to secure by Letters Patent without restriction as to any precise forms of the parts or minor details of the novel construction shown, is—

In combination with a series of suitable conveyer-troughs running in different directions on the same level, and a series of wheels having their axes of motion transverse to the planes of the trough-floors, a carrier chain or belt provided with flights which project edgewise of the chain or belt and travel in the said troughs, all substantially as and for the purposes set forth.

In witness whereof I have hereunto set my hand this 27th day of December, 1886.

JAMES M. DODGE.

In presence of—
D. E. KERN,
H. E. FRANK.